(12) United States Patent
Kato

(10) Patent No.: US 8,187,417 B2
(45) Date of Patent: May 29, 2012

(54) DISASSEMBLY METHOD FOR MEMBRANE ELECTRODE ASSEMBLY FOR FUEL CELL AND DISASSEMBLY METHOD FOR FUEL CELL

(75) Inventor: Michiaki Kato, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 274 days.

(21) Appl. No.: 12/670,312

(22) PCT Filed: Jul. 16, 2008

(86) PCT No.: PCT/JP2008/062842
§ 371 (c)(1),
(2), (4) Date: Jan. 22, 2010

(87) PCT Pub. No.: WO2009/014045
PCT Pub. Date: Jan. 29, 2009

(65) Prior Publication Data
US 2010/0200161 A1      Aug. 12, 2010

(30) Foreign Application Priority Data

Jul. 25, 2007    (JP) ................................. 2007-193654

(51) Int. Cl.
*B32B 38/10* (2006.01)

(52) U.S. Cl. ........ 156/710; 156/709; 156/711; 156/752; 29/762; 29/763; 29/426.4

(58) Field of Classification Search ................. 29/426.4, 29/762, 763; 156/709, 710, 711, 752
See application file for complete search history.

(56) References Cited

U.S. PATENT DOCUMENTS

| 6,383,329 | B1 * | 5/2002 | Agarwala et al. | 156/706 |
| 7,175,728 | B2 * | 2/2007 | Kiuchi et al. | 156/248 |
| 2004/0241523 | A1 | 12/2004 | Yamada | |
| 2006/0124241 | A1 * | 6/2006 | Doi et al. | 156/344 |

FOREIGN PATENT DOCUMENTS

| EP | 0 717 458 A1 | 6/2006 |
| JP | 11-16594 A | 1/1999 |
| JP | 2005-235504 A | 9/2005 |
| JP | 2005-289001 A | 10/2005 |
| JP | 2006-095363 | 4/2006 |
| JP | 2006-278070 A | 10/2006 |
| JP | 2008-146985 A | 6/2008 |

* cited by examiner

*Primary Examiner* — Mark A Osele
*Assistant Examiner* — Nickolas Harm
(74) *Attorney, Agent, or Firm* — Kenyon & Kenyon LLP

(57) ABSTRACT

A disassembly method for membrane electrode assembly for fuel cell, and a disassembly method for fuel cell are provided, disassembly methods which are advantageous for the recovery of catalysts that are included in catalytic layers by making structural destruction of the catalytic layers progress by means of expanding a volumetrically-expandable material inside the catalytic layers. In such a state that a catalytic layer includes a volumetrically-expandable material that is capable of expanding volumetrically, the volumetrically-expandable material, which is included in the catalytic layer, is expanded by means of expansion treatment. Next, expansion of the volumetrically-expandable material, which has undergone volumetric expansion in the catalytic layer, is cancelled.

12 Claims, 4 Drawing Sheets

DISASSEMBLY METHOD FOR MEMBRANE ELECTRODE ASSEMBLY FOR FUEL CELL AND DISASSEMBLY METHOD FOR FUEL CELL

This is a 371 national phase application of PCT/JP2008/062842 filed 16 Jul. 2008, claiming priority to Japanese Patent Application No. 2007-193654 filed 25 Jul. 2007, the contents of which are incorporated herein by reference.

TECHNICAL FIELD

The present invention relates to a disassembly method for membrane electrode assembly for fuel cell, and a disassembly method for fuel cell.

BACKGROUND ART

As for a technique regarding the disassembly of fuel cell, a technique has been known, technique in which a come-off assisting member is disposed between the peripheral portion of an electrolytic membrane, which constitutes a membrane electrode assembly, and the peripheral portion of a gas diffusion layer, thereby facilitating the mechanical come-off between the electrolytic membrane and the gas diffusion layer (Patent Literature No. 1).

Moreover, as for a technique regarding the reutilization method of fluorine-containing polymer, a technique has been known, technique which executes the following steps: a step of making a membrane electrode assembly ready, membrane electrode assembly in which an electrolytic membrane, a catalytic layer and a gas diffusion layer are laminated in this order, and then swelling the electrolytic membrane of the membrane electrode assembly; a step of winding the membrane electrode assembly, which is equipped with the swollen electrolytic membrane, around a roller body as a rolled shape; a step of freezing the membrane electrode assembly, which is wound around the roller body, with liquid nitrogen along with that electrolytic membrane; and thereafter a step of turning the frozen and cured catalytic layer of the membrane electrode assembly into a powder by pulverizing it with a pulverizing roller. (Patent Literature No. 2).

Patent Literature No. 1: Japanese Unexamined Patent Publication (KOKAI) Gazette No. 2006-278,070; and Patent Literature No. 2: Japanese Unexamined Patent Publication (KOKAI) Gazette No. 2005-289,001

DISCLOSURE OF THE INVENTION

Assignment to be Solved by the Invention

In the industrial world, the development of disassembly method that is furthermore advantageous for the disassembly of membrane electrode assembly has been requested. The present invention is one which has been done in view of the aforementioned circumstances, and it is an assignment to provide a disassembly method for membrane electrode assembly for fuel cell, and a disassembly method for fuel cell, disassembly methods which are furthermore advantageous for the disassembly of membrane electrode assembly.

Means for Solving the Assignment

A disassembly method for membrane electrode assembly for fuel cell that is directed to a first invention is for disassembling a membrane electrode assembly for fuel cell in which a catalytic layer comprising a catalyst and an electrolytic membrane are laminated; and comprises:

an expansion step of volumetrically expanding a volumetrically-expandable material, which is capable of expanding volumetrically, in such a state that the catalytic layer includes the volumetrically-expandable material; and an expansion cancelation step of canceling or reducing volumetric expansion of the volumetrically-expandable material that has undergone volumetric expansion in the catalytic layer.

A disassembly method for fuel cell that is directed to a second invention is for disassembling a fuel cell that is equipped with: a membrane electrode assembly for fuel cell in which an electrolytic membrane, a catalytic layer comprising a catalyst, and a reaction-fluid diffusion layer are laminated in this order; and a separator being laminated on the membrane electrode assembly; and comprises:

an expansion step of volumetrically expanding a volumetrically-expandable material, which is capable of expanding volumetrically, in such a state that the catalytic layer includes the volumetrically-expandable material; and an expansion cancelation step of canceling or reducing volumetric expansion of the volumetrically-expandable material that has undergone volumetric expansion in the catalytic layer.

In accordance with the present inventions, a volumetrically-expandable material is included in a catalytic layer at the expansion step. The volumetrically-expandable material that is included in the catalytic layer expands volumetrically inside the catalytic layer. In this case, stress acts on the catalytic layer, and collapse of the catalytic layer proceeds from the inside.

Thereafter, the volumetric expansion of the volumetrically-expandable material that is included in the catalytic layer is canceled or reduced. Considering a cycle that includes the aforementioned expansion step and expansion cancelation step a disassembly cycle, it is possible to execute the disassembly cycle at least once. It is also allowable to execute the disassembly cycle twice, or it is even allowable to execute the disassembly cycle three times; further, it is even allowable to execute it more than that.

In accordance with the present inventions, it is preferable that the volumetrically-expandable material can be fluidic substances, especially, liquids, which are capable of freezing. It is preferable that the expansion step can be a freeze step of freezing the liquid, which is included in the catalytic layer, in such a state that the catalytic layer includes the liquid that is in an unfrozen state. It is preferable that the expansion cancelation step can be a defreeze step of facilitating defreeze of the liquid that has been frozen in the catalytic layer.

In accordance with the present inventions, as for a membrane electrode assembly, membrane electrode assemblies in which an electrolytic membrane, a catalytic layer and a reaction-fluid diffusion layer are laminated in this order can be named. Alternatively, membrane electrode assemblies in which an electrolytic membrane and a catalytic layer are laminated can be named. In this case, the reaction-fluid diffusion layer is separated from the membrane electrode assembly in advance.

It is preferable that the electrolytic membrane can be proton conductive membranes; it is also allowable that it can be polymer-type ones, such as perfluorinated sulfonic acid resins being provided with functional groups like sulfonic acid groups; it is also allowable that it can be inorganic-material type ones, such as those being glassy; or it is even allowable that it can be coexistence-type ones in which a polymer and an inorganic material coexist. It is preferable that the electrolytic material can be impregnated with the volumetrically-expandable material, such as water. The aforementioned catalytic layer is one which includes a catalyst that facilitates electric-power generation reaction. As for the catalyst, although noble-metal-based ones, such as platinum, rhodium, ruthenium, palladium and gold, can be exemplified, it cannot be limited to these. The catalytic layer is of porosity that makes reaction fluids permeate therethrough, is of electron conductivity, and has an electrolytic component.

In a manufacture process of the membrane electrode assembly, it is also allowable that the catalytic layer can be adhered on the electrolyte side; or it is even allowable that it can be adhered on the gas-diffusion-layer side. Moreover, in the aforementioned manufacture process, it is also allowable that the catalytic layer can be adhered on both of the electrolyte and gas diffusion layer, respectively, and then the catalyst on the electrolyte and the catalyst on the gas diffusion layer can be integrated by laminating them when forming the membrane electrode assembly. Further, it is even allowable that an intermediate layer can be disposed between the gas diffusion layer and the catalytic layer, intermediate layer in which, though a catalyst is not contained, micro electron conductors (namely, carbon black, such as acetylene black, for instance) and an electrolytic component are adapted into the substrate.

As for the reaction fluid to be supplied to the membrane electrode assembly, hydrogen gases, hydrogen-containing gases, oxygen gases, and oxygen-containing gases can be exemplified. The reaction-fluid diffusion layer is one which is exhibits fluid permeability (or porosity) and electric conductivity, and fibrous accumulated substances can be exemplified, fibrous accumulated substances in which electrically-conductive fibers, such as carbon fibers or metallic fibers, are accumulated.

As for the volumetrically-expandable material that undergoes volumetric expansion, it can preferably be liquids that undergo volumetric expansion by means of freeze, taking the handleability into account. Especially, taking the cost and handleability into consideration, water, water-system solutions, and alcohol-system solutions can be exemplified. Due to such a reason for adjusting the freezing temperature (or freezing point), and the lie, it is also allowable that another component can be compounded into a liquid, such as water.

Ina case where the volumetrically-expandable material, such as water, is included in the electrolytic material, it is preferable at the expansion step that, although the volumetrically-expandable material, such as water, which is included in the catalytic layer is expanded, the volumetrically-expandable material, such as water, which is included in the electrolytic membrane, cannot be expanded too much. Moreover, it is preferable that, compared with an expansion coefficient of the volumetrically-expandable material in the catalytic layer, an expansion coefficient of the volumetrically-expandable material in the electrolytic membrane can be less.

In this case, since the volumetrically-expandable material that is included in the catalytic layer expands inside the catalytic layer, or at the interface between the electrolytic membrane and the reaction fluid diffusion layer, it is likely that structural destruction of the catalytic layer proceeds or come-off of the aforesaid interface proceeds. However, since the expansion of the volumetrically-expandable material that is included in the electrolytic membrane is kept down, causing damages to the electrolytic membrane is suppressed.

Consequently, in the case of volumetric expansion by means of freeze, it is preferable that the freeze step can keep down a freeze proportion of the liquid in the electrolytic membrane lower than a freeze proportion of the liquid in the catalytic layer, though the freeze step freezes the liquid that is included in the catalytic layer. Therefore, it is preferable not to freeze water that is included in the electrolytic membrane; alternatively it is preferable to make a freeze proportion of water that is included in the electrolytic membrane less than a freeze proportion of water that is included in the catalytic layer.

The "freeze proportion" refers to a mass percentage of frozen water with respect to the entire mass of water included in the relevant parts. In this case, since water included in the catalytic layer freezes actively, the destruction of the catalytic layer proceeds from the inside by means of volumetric expansion. However, since the freeze of water included in the electrolytic membrane is kept down, damaging the electrolytic membrane is suppressed. Therefore, it is possible to reutilize the electrolytic membrane.

In accordance with the present inventions, the volumetrically-expandable material can preferably be water, and then the moisture content in the electrolytic membrane of the membrane electrode assembly lowers as the temperature lowers. As the temperature lowers, water that is discharged from the electrolytic membrane of the membrane electrode assembly moves to the interface between the electrolytic membrane and the catalytic layer, and then freezes at the interface. In this case, it is possible to furthermore facilitate the coming-off property between the electrolytic membrane and the catalytic layer.

In accordance with the present inventions, it is possible to execute a retention step of retaining the volumetrically-expandable material in the catalytic layer of the membrane electrode assembly by impregnating the catalytic layer with the volumetrically-expandable material before the expansion step, preferably before the expansion step. In this way, the volumetric expandability of the volumetrically-expandable material at the catalytic layer heightens, and thereby the structural destruction of the catalytic layer becomes likely to proceed. Moreover, as for the retention step, it is possible to exemplify a mode in which the retention is executed by contacting the membrane electrode with the volumetrically-expandable material and then impregnating the catalytic layer with the volumetrically-expandable material. In this way, the volumetrically-expandable material becomes likely to permeate into the catalytic layer of the membrane electrode assembly, the volumetric expandability at the catalytic layer heightens, and thereby the structural destruction of the catalytic layer becomes likely to proceed.

Therefore, it is possible to execute a retention step in which a liquid, such as water, is retained in the catalytic layer of the membrane electrode assembly by impregnating the latter with the former actively before the freeze step. In this way, the volumetric expandability of the liquid, such as water, heightens, and thereby the structural destruction of the catalytic layer becomes likely to proceed. Moreover, as for the retention step, it is possible to exemplify a mode in which the retention is executed by contacting the membrane electrode with a liquid, such as water, and then impregnating the catalytic layer with the liquid. In this way, the liquid becomes likely to permeate into the catalytic layer of the membrane electrode assembly, the volumetric expandability at the catalytic layer heightens, and thereby the structural destruction of the catalytic layer becomes likely to proceed. Note that, under the atmospheric pressure, water is said to expand volumetrically by 5-10% approximately in general.

Moreover, as for the retention step, it is possible to exemplify a mode in which water is generated inside the membrane electrode assembly by means of generating electricity at the membrane electrode assembly by supplying a fuel fluid and an oxidizing-agent fluid to the membrane electrode assembly.

Water is generated at an oxidizing-agent electrode by manes of electricity generation reaction. Therefore, it is advantageous for the freeze of the catalytic layer on a side of the oxidizing-agent electrode. The water that is generated at the oxidizing-agent electrode permeates into a fuel electrode as well. Therefore, it is advantageous for the freeze of the catalytic layer on a side of the fuel electrode.

It is possible to exemplify a mode which executes a separation step of separating the reaction-fluid diffusion layer and the electrolytic membrane from each other after the expansion cancelation step after the aforementioned expansion cancelation step. In this case, since the electrolytic membrane is separated, it is advantageous for the recovery and reutilization of the electrolytic membrane. Moreover, it is possible to exemplify a mode which recovers a catalyst, which is included in the catalytic layer, after the expansion cancelation step. In this case, since the catalyst is recovered, it is advantageous for the reutilization of the catalyst.

Effect of the Invention

In accordance with the present inventions, it is advantageous for proceeding the destruction of the inner structure of the catalytic layer by means of the disassembly cycle that has the volumetric expansion of the volumetrically-expandable material (a liquid, such as water, for instance) and expansion cancelation. Therefore, it is possible to contribute to the destruction of membrane electrode assemblies. Therefore, it is advantageous for the disassembly of membrane electrode assemblies, and moreover for the disassembly of fuel cells. Furthermore, in the case of reutilizing the constituent elements of membrane electrode assemblies, it is possible to make the reutilization easy.

EXPLANATION ON REFERENCE NUMERALS

"1" designates a membrane electrode assembly; "2" designates an electrolytic membrane; "3" designates a catalytic layer; "3o" designates a catalytic layer for oxidizing agent; "3f" designates a catalytic layer for fuel; "4" designates a gas diffusion layer (i.e., the claimed reaction-fluid diffusion layer); "4o" designates a gas diffusion layer for oxidizing agent; "4f" designates a gas diffusion layer for fuel; and "200" designates a stack.

BEST MODE FOR CARRYING OUT THE INVENTION

Example No. 1

Figure 1:
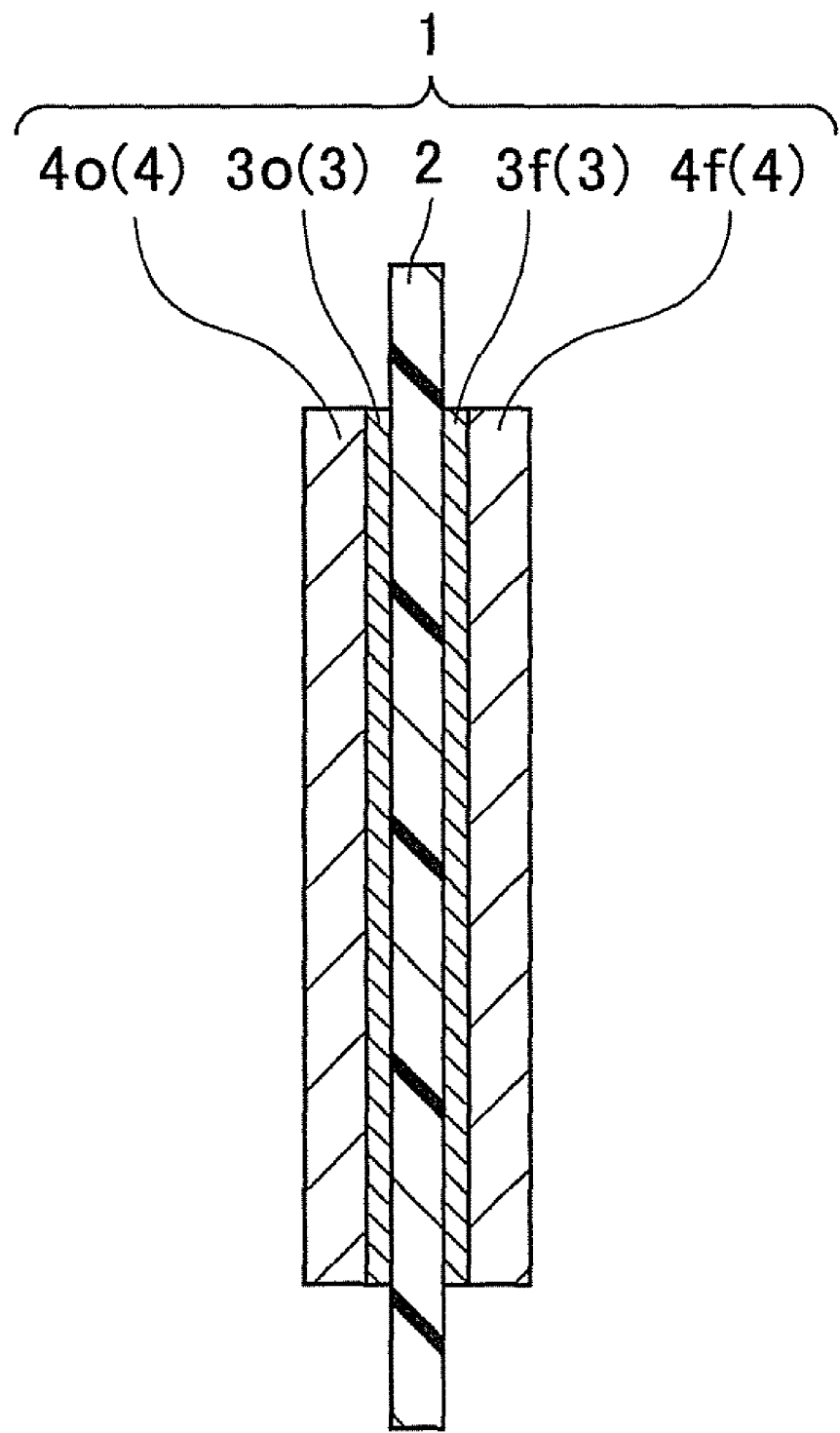
FIG. 1 is a cross-sectional diagram for schematically illustrating a membrane electrode assembly.

FIG. 1 illustrates Example No. 1. Example No. 1 is a disassembly method for disassembling a membrane electrode assembly 1 for fuel cell, membrane electrode assembly 1 in which a catalytic layer including catalyst, and an electrolytic membrane are laminated. FIG. 1 shows the membrane electrode assembly 1. The membrane electrode assembly 1 is formed by laminating an electrolytic membrane 2, a catalytic layer 3, and a gas diffusion layer 4 serving as the claimed reaction-fluid diffusion layer in this order. That is, as illustrated in FIG. 1, when being viewed on the fuel-electrode side, the membrane electrode assembly 1 is formed by laminating the electrolytic membrane 2, a catalytic layer $3f$ for fuel and a gas diffusion layer $4f$ for fuel in this order in the thickness direction. When being viewed on the oxidizing-agent-electrode side, the membrane electrode assembly 1 is formed by laminating the electrolytic membrane 2, a catalytic layer $3o$ for oxidizing agent and a gas diffusion layer $4o$ for oxidizing agent in this order in the opposite direction. Hereinafter, the catalytic layer $3f$ for fuel, and the catalytic layer for oxidizing agent are combined to refer to them as the catalytic layer 3. Hereinafter, the gas diffusion layer $4f$ for fuel, and the gas diffusion layer $4f$ for oxidizing agent are combined to refer to them as the gas diffusion layer 4.

The electrolytic membrane 2 is a proton conductive membranes, namely, it is a polymer-type one, such as a perfluorinated sulfonic acid resin being provided with functional groups like sulfonic acid groups, and the like. However, the electrolytic membrane 2 is not limited to this. The catalytic layer 3 includes catalysts for facilitating electric-power generation reaction. As for the catalysts, it is possible to name noble metals, such as platinum, rhodium, ruthenium, palladium and gold. The catalytic layer 3 is of porosity that makes reaction fluids, such as gases, permeate therethrough, is of electron conductivity, and has an electrolytic component. Therefore, the catalytic layer 3 includes the following as the substrate; micro electron conductors (namely, acetylene black, or a graphite powder, for instance) on which catalysts are loaded; and an electrolytic component with proton conductivity; and it is even allowable to include electron-conductive fibers, such as carbon fibers, if needed. Therefore, the catalytic layer 3 includes catalysts, micro electron conductors, and an electrolytic component with proton conductivity.

As for the reaction fluid to be supplied to the fuel electrode, it is possible to name hydrogen gases, hydrogen-containing gases, and methanol. As for the other reaction fluid to be supplied to the oxidizing-agent electrode, it is possible to exemplify oxygen gases, and oxygen-containing gases. The gas diffusion layer 4 exhibits fluid permeability (or gas permeability) and electron conductivity, and is formed of a fibrous accumulated substance that serves as the substrate, and which is made by accumulating electrically-conductive fibers, such as carbon fibers or metallic fibers.

Taking cost and handleability into consideration, the claimed liquid is water; and it is also allowable to compound the other components into water. A freeze step (or expansion step) of the aforementioned disassembly cycle is executed by means of retaining the membrane electrode assembly 1 at the freeze initiation temperature of water or less. Under atmospheric pressure, water freezes at 0° C. in general. Depending on conditions, such as the types of the electrolytic membrane 2, though, it is said that water being included in the electrolytic membrane 2 freezes at 5° C. below zero-70° C. below zero approximately, alternatively at 15° C. below zero-50° C. below zero approximately, alternatively at 25° C. below zero-35° C. below zero approximately. Therefore, when labeling a temperature at which water being included in the catalytic layer 3 freezes "T1" and labeling a temperature at which water being included in the electrolytic membrane 2 freezes "T2," they are set so as to be "T1">"T2" by absolute temperature.

In accordance with the present example, the membrane electrode assembly 1 is maintained between "T1" and "T2" at the freeze step. As a result, water, which is included in the catalytic layer 3 of the membrane electrode assembly 1, freezes. However, water, which is included in the electrolytic membrane 2, does not freeze. Alternatively, it is also allowable to maintain the membrane electrode assembly 1 in low temperature regions where the freeze of water that is included in the electrolytic membrane 2 can be kept down more than that at the catalytic layer 3. In this case, water that is included in the catalytic layer 3 freezes to turn into ice, thereby undergoing volumetric expansion. Accordingly, stress acts onto the moisture-containing parts of the membrane electrode assembly 1 by means of the volumetric expansion, and then the structural destruction of the catalytic layer 3 proceeds from the inside so that the catalytic layer 3 becomes pulverulent. However, damaging the electrolytic membrane 2 is suppressed, because the freeze of water that is included in the electrolytic membrane 2 is kept down. Hence, the setting is advantageous for the reutilization of the electrolytic membrane 2.

The structural destruction of the catalytic layer 3, which is held between the gas diffusion layer 4 and the electrolytic membrane 2, proceeds as aforementioned. In this way, the coming-off property between the gas diffusion layer 4 and the electrolytic membrane 2 is facilitated, because the catalytic layer 3 collapses progressively. Therefore, it is possible to separate the gas diffusion layer 4 from the electrolytic membrane 2, or vice versa, satisfactorily. Hence, it is suitable for the instance of reutilizing the gas diffusion layer 4 and/or the electrolytic membrane 2.

When cooling the membrane electrode assembly 1 at the freeze step, water that is included in the electrolytic membrane 2 of the membrane electrode assembly 1 is discharged gradually. The reason for it is as follows: the moisture content in the electrolytic membrane 2 depends on the temperature, and accordingly the moisture content heightens when being high temperatures and the moisture content lowers when being low temperatures; and consequently an amount of water that can be retained in the electrolytic membrane 2 lowers because of becoming low temperatures. The water, which has been discharged from electrolytic membrane 2, moves to the interface between the catalytic layer 3 and the electrolytic membrane 2. Further, the water migrates toward the catalytic layer 3 (or 3o and 3f), and is then absorbed into the catalytic layer 3 (or 3o and 3f) to heighten the moisture content in the catalytic layer 3. Since the moisture content in the catalytic layer 3 thus heightens, the water heightens the volumetric expandability of the catalytic layer 3 and then heightens the collapsing property of the catalytic layer 3 furthermore. Moreover, when the water, which has moved to the interface between the catalytic layer 3 and the electrolytic membrane 2, freezes to undergo volumetric expansion, it facilitates the coming-off property between the catalytic layer 3 and the electrolytic membrane 2 furthermore, and eventually facilitates the coming-off property between the gas diffusion layer 4 and the electrolytic membrane 2 furthermore. In this case, damaging the electrolytic membrane 2 is reduced.

At the defreeze step (or expansion cancelation step) of the disassembly cycle, the membrane electrode assembly 1 undergoes temperature increase after executing the freeze step, and is then maintained at a predetermined temperature, and thereby the membrane electrode assembly 1 is defrozen. When the membrane electrode assembly 1 is defrozen, the disassemblage property of the catalytic layer 3 progresses because the freeze-cured state of the catalytic layer 3 is canceled. Accordingly, compared with the system in which the membrane electrode assembly 1 is pulverized in such a state that the catalytic layer 3 is freeze cured, it is advantageous for recovering the constituent components of the catalytic layer 3 while keeping down damages to the catalytic layer 3. As for the constituent components of the catalytic layer 3, it is possible to name catalysts, electrolytic components, and electron conductors (e.g., carbon black, graphite-powder particles, and the like). Note that, in accordance with the present example, although water is employed as a freezing substance, it is also allowable to employ acetone, ethyl alcohol, acetic acid, and so forth, instead of water, or together with water. It is even allowable to compound a solidifying-point adjuster component, if needed.

Example No. 2

Since the present example operates and effects advantages in the same manner as does Example No. 1 fundamentally, FIG. 1 is applied accordingly. Hereinafter, the present example will be explained while focusing on parts that are different from those of Example No. 1. In accordance with the present example, the disassembly cycle, which includes the aforementioned freeze step and defreeze step, is executed twice or more repeatedly. Therefore, the following are executed: the freeze step ---> the defreeze step ---> the freeze step ---> the defreeze step. Moreover, the following are executed: the freeze step ---> the defreeze step ---> the freeze step ---> the defreeze step ---> the freeze step ---> the defreeze step. In this way, the volumetric expansion of water, which is included in the catalytic layer 3, is executed repeatedly. Consequently, the structurally collapsing property of the catalytic layer 3 heightens more.

Example No. 3

Figure 2:
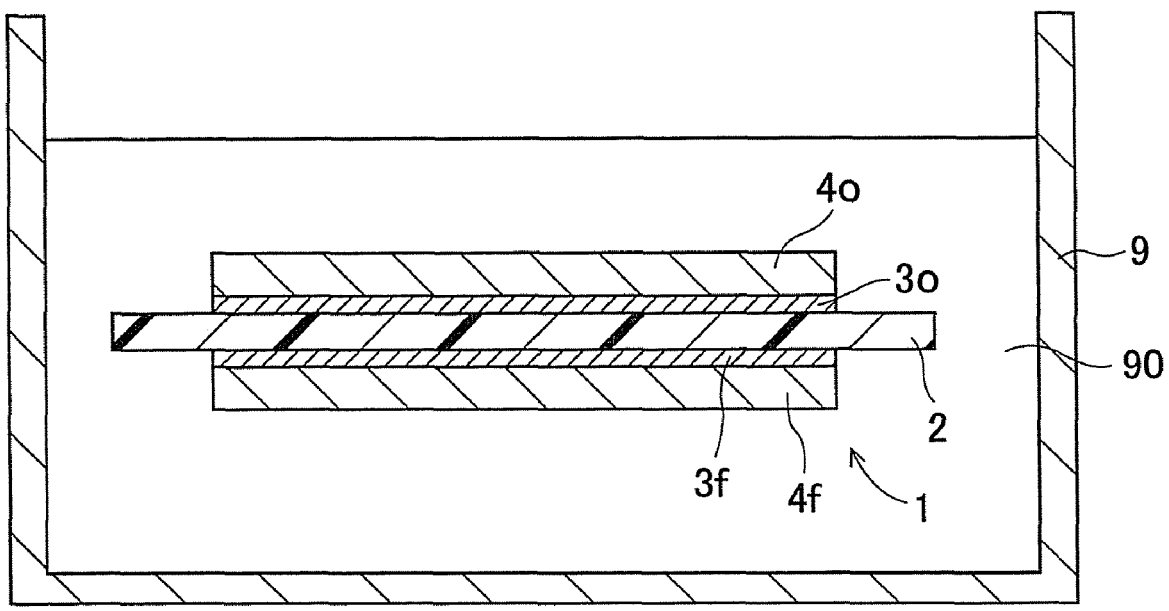
FIG. 2 is a cross-sectional diagram for schematically illustrating such a state that a membrane electrode assembly is immersed in water.

Since the present example operates and effects advantages in the same manner as does Example No. 1 fundamentally, FIG. 1 is applied accordingly. Hereinafter, the present example will be explained while focusing on distinct parts. In accordance with the present example, a retaining step of retaining water (i.e., the claimed liquid) in the catalytic layer 3 (or the catalytic layer 3o and catalytic layer 3f) of the membrane electrode assembly 1 is executed before executing the disassembly cycle. In this way, water is absorbed into the catalytic layer 3, and accordingly the moisture content in the catalytic layer 3 heightens. Hence, at the freeze step, the freezability of water that is included in the catalytic layer 3 is enhanced, and consequently the structural destruction of the catalytic layer 3 becomes likely to progress by means of the volumetric expansion. In this case, as for the retaining step, the inside of the catalytic layer is impregnated with water (i.e., the claimed volumetrically-expandable material) by contacting water with the membrane electrode assembly 1 for a predetermined time by means of immersing the membrane electrode assembly 1 into water 90 (i.e., the claimed volumetrically-expandable material) that is accommodated in a container 9, as shown in FIG. 2. Although the predetermined time can be set up suitably, it is possible to exemplify 10 seconds-2 hours, or 30 seconds-1 hour; however, it is not limited to these. In this way, a large amount of water permeates into the inside of the catalytic layer 3 of the membrane electrode assembly 1. Hence, the freezability at the catalytic layer 3 heightens in the freeze step (i.e., the claimed expansion step), and thereby the structural destruction of the catalytic layer 3 becomes likely to progress by means of the volumetric expansion.

Preferably, the disassembly cycle, which includes the aforementioned freeze step and defreeze step, can be executed twice or more repeatedly. It is preferable to execute the water retention step in early phase of the disassembly cycle; however, depending on cases, it is also allowable to carry it out in the middle of the disassembly cycle, or it is even allowable to carry it out every time before the disassembly cycle is done. Therefore, it is possible to execute the following in sequence: the retention step ---> the freeze step ---> the defreeze step ---> the retention step ---> the freeze step ---> the defreeze step. Moreover, it is possible to execute the following in sequence: the retention step ---> the freeze step ---> the defreeze step ---> the freeze step ---> the defreeze step ---> the freeze step ---> the defreeze step. Moreover, as for the retention step, it is also allowable to adapt into spraying showering water onto the membrane electrode assembly 1.

Example No. 4

Since the present example operates and effects advantages in the same manner as does Example No. 1 fundamentally, FIG. 1 is applied accordingly. Hereinafter, the present example will be explained while focusing on distinct parts. In accordance with the present example, when labeling a temperature at which water being included in the catalytic layer 3 freezes "T1" and labeling a temperature at which water being included in the electrolytic membrane 2 freezes "T2," they are set so as to be "T1">"T2" by absolute temperature. At the freeze step, the membrane electrode assembly 1 is maintained in a low temperature range whose temperature is lower than "T2" (40° C. below zero-100° C. below zero, for instance). In this case, since there is such a fear that the electrolytic membrane 2 might be damaged more or less, the electrolytic membrane 2 can preferably be those which are strong against damages. Thereafter, the membrane electrode assembly 1 is left at room temperature, and then the defreeze step of facilitating the defreeze of the membrane electrode assembly 1 is executed.

Example No. 5

Figure 3:
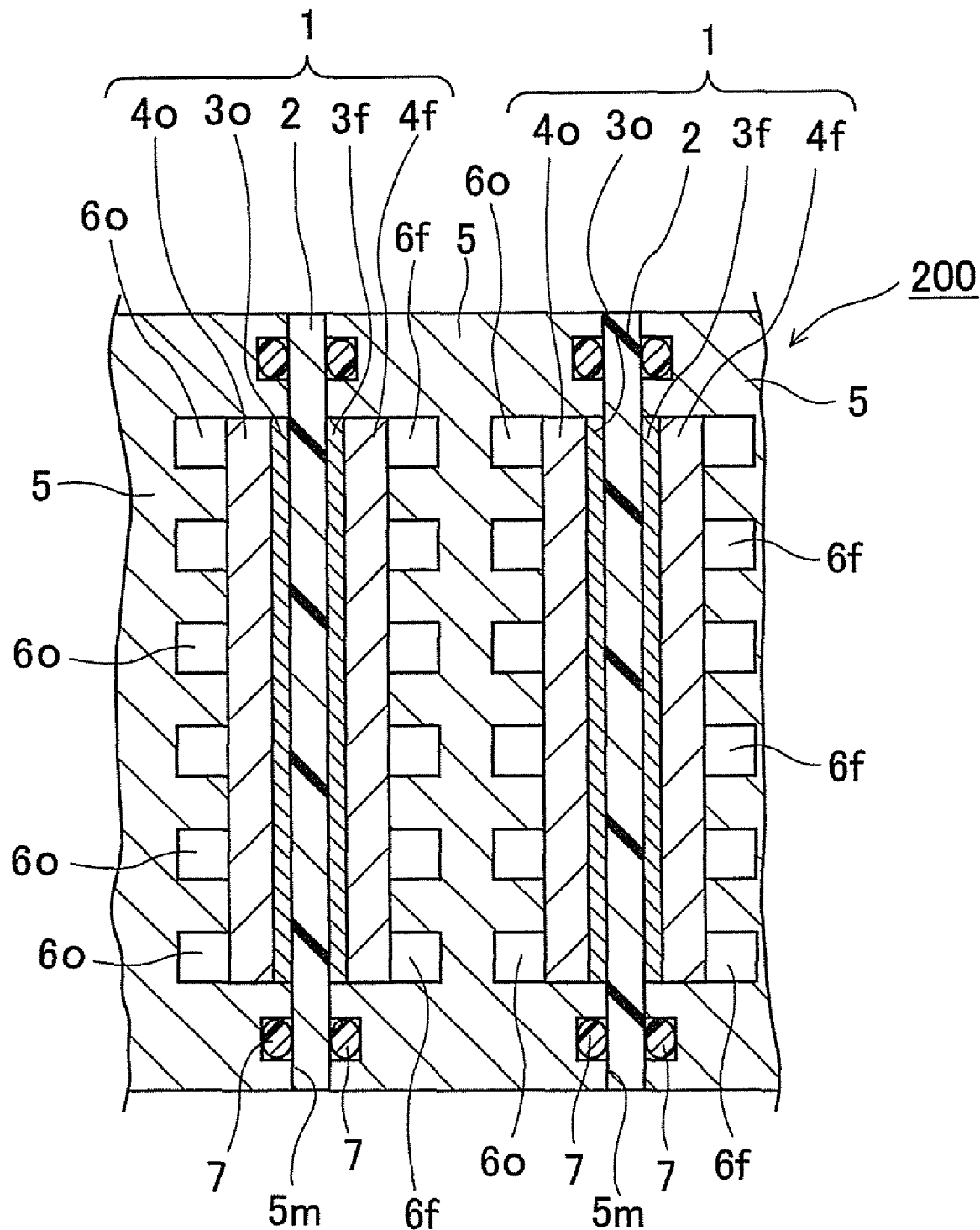
FIG. 3 is a cross-sectional diagram for schematically illustrating such a state that membrane electrode assemblies are held between separators.

FIG. 3 illustrates Example No. 5. The present example operates and effects advantages in the same manner as does Example No. 1 fundamentally. In what follows, too, the present example will be explained while focusing on distinct parts. In accordance with the present example, the water retention step, the freeze step, and the defreeze step are executed in such a state as being stacked. A stack is formed by holding the membrane electrode assemblies 1 between separators 5. The separators 5 have flow passages 6o for supplying an oxidizing-agent fluid to the gas diffusion layers 4o for oxidizing agent in the membrane electrode assemblies 1. Moreover, the separators 5 have flow passages 6f for supplying a fuel fluid to the gas diffusion layers 4f for fuel in the membrane electrode assemblies 1. A sealing material 7 is put in place between the adjoining separators 5.

First of all, prior to the disassembly of the stack, a retention step is executed, retention step in which water, the claimed liquid, is retained actively in the catalytic layer 3 of the membrane electrode assemblies 1. In this case, not only a fuel fluid (e.g., a hydrogen gas, or a hydrogen-containing gas) is supplied to the flow passage 6f for fuel in the separators 5, but also an oxidizing-agent fluid (e.g., an oxygen gas, or an oxygen-containing gas) is supplied to the flow passage 6o in the separators 5, thereby executing an electric-power generating operation for a predetermined time. The predetermined time can be set up suitably, and it is possible to exemplify 5 minutes-100 hours, 10 minutes-10 hours, or 15 minutes-1 hour. An electric-power generation reaction occurs in the membrane electrode assemblies 1 by means of the electric-power generating operation. Water is generated at the oxidizing-agent electrodes of the membrane electrode assemblies 1 by means of the electric-power generating operation. In this case, it is preferable to run the membrane electrode assemblies 1 under such electric-power-generating operational conditions that dare to cause flooding. In this way, an amount of water that is included in the catalytic layer 3 (or the catalytic layer 3o and catalytic layer 3f) increases; accordingly, the moisture content in the catalytic layer 3 (or the catalytic layer 3o and catalytic layer 3f) heightens; consequently, the freezability of the catalytic layer 3 (or the catalytic layer 3o and catalytic layer 3f) is enhanced; and thereby the structural destruction of the catalytic layer 3 becomes likely to progress by means of the volumetric expansion.

As aforementioned, in accordance with the present example, it is possible to enhance the moisture content in the catalytic layer 3o for oxidizing agent by means of the electric-power generating operation immediately before the disassembly; and accordingly it is advantageous for freezing the catalytic layer 3o for oxidizing agent; and consequently it is possible to secure a volumetric-expansion magnitude at the time of freezing. The water, which is generated at the catalytic layer 3o for oxidizing agent by means of the electric-power generating operation, permeates to the catalytic layer 3f for fuel as well. Therefore, it is possible to enhance the moisture content in the catalytic layer 3f for fuel; and accordingly it is advantageous for freezing the catalytic layer 3f for fuel; and consequently it is possible to secure a volumetric-expansion magnitude at the time of freezing.

Example No. 6

Since the present example operates and effects advantages in the same manner as does Example No. 1 fundamentally, FIG. 3 is applied accordingly. In what follows, too, the present example will be explained while focusing on distinct parts. In accordance with the present example, the water retention step, the freeze step, and the defreeze step are executed in such a state as being stacked. First of all, prior to the disassembly of the stack, a retention step is executed, retention step in which water is retained actively in the catalytic layer 3 of the membrane electrode assemblies 1. In this case, not only water (i.e., the claimed liquid) is supplied to the flow passage 6f for fuel in the separators 5 by means of a water feeding means (or liquid feeding means), such as a pump, but also water is supplied to the flow passage 6o for oxidizing agent in the separators 5 by means of the water feeding means. In this way, water is injected inside the stack. Thus, the catalytic layer 3 (or the catalytic layer 3o and catalytic layer 3f) is impregnated with water, and then the moisture content in the catalytic layer 3 (or the catalytic layer 3o and catalytic layer 3f) heightens. Thereafter, a freeze step is executed. At the freeze step, the stack is left in a temperature range whose temperature is a freezable temperature of water or less (20° C. below zero, for instance) for a predetermined time (60-90 minutes, for instance). In this case, it is preferable not to let water in the electrolytic membrane 2 freeze, though the retention temperature for the stack is set up to a freezing temperature of the electrolytic membrane 2 or more in order to make water inside the catalytic layer 3 (or the catalytic layer 3o and catalytic layer 3f) freeze.

Thereafter, the stack is defrozen by returning it back to room temperature and then leaving it thereat for a predetermined time (30-90 minutes, for instance). The aforementioned freeze step and defreeze step make the disassembly cycle (not including the retention step). Such a disassembly cycle is executed a plurality of cycles in total, if needed. Finally, the stack is returned back to room temperature, and then the stack is disintegrated by removing the separators 5 and membrane electrode assemblies 1. By means of thus repeating the freeze step and defreeze step, the structural destruction of the catalytic layer 3 progresses at the membrane electrode assemblies 1 that are incorporated into the stack. Therefore, the coming-off property between the gas diffusion layer 4 and the electrolytic membrane 2 improves.

Further, in a case where water permeates between the separators 5*f* and 5*o* as well to freeze between them, it is possible to expect volumetric expansion of water that permeates into spaces 5*m* between the separators 5*f* and 5*o*. In this case, the separating property between the adjoining separators 5 improves, because the interval between the adjoining separators 5 increases.

Example No. 7

The present example operates and effects advantages in the same manner as does Example No. 1 fundamentally. In what follows, too, the present example will be explained while focusing on distinct parts. In accordance with the present example, catalysts that are included in the catalytic layer 3 (or the catalytic layer 3*o* and catalytic layer 3*f*) are recovered after the catalytic layer 3 is collapsed by means of the disassembly cycle. In this case, the collapsed parts are stirred while immersing them within a container that accommodates a recovery solution therein. Specifically, the collapsed parts are contacted with the recovery solution. In this way, it is possible to recover catalysts, which are included in the catalytic layer 3 (or the catalytic layer 3*o* and catalytic layer 3*f*), by dissolving (or wet dissolving) them into the recovery solution as ions. As for the recovery solution, it is possible to exemplify aqua regia, sulfuric acid solutions, and nitric acid solutions. It is possible to recover the catalysts by adding a reducing agent to the recovery solution and then reducing the catalytic ions electrochemically. It is often the case noble-metal catalysts are employed as the catalysts. It is important to recover and then reutilize noble-metal catalysts because they are precious.

Example No. 8

The present example operates and effects advantages in the same manner as does Example No. 1 fundamentally. FIG. 3 illustrates major sections of a stack 200 schematically. As illustrated in FIG. 3, the stack 200 is equipped with: membrane electrode assemblies 1 for fuel cell, membrane electrode assemblies 1 in which an electrolytic membrane 2, catalytic layers 3 including catalysts, and gas diffusion layers 4 (i.e., the claimed reaction-fluid diffusion layer) are laminated in this order; and carbonaceous or metallic (alloy steel, for instance) separators 5 that are laminated on the membrane electrode assemblies 1. The separators 5 are provided with the following: flow passages 6*f* for supplying a fuel fluid (e.g., a hydrogen gas, or a hydrogen-containing gas) to the gas diffusion layer 4 for fuel in the membrane electrode assemblies 1; and flow passages 6*o* for supplying an oxidizing-agent fluid (e.g., an oxygen gas, or an oxygen-containing gas) to the gas diffusion layer 4 for oxidizing agent in the membrane electrode assemblies 1.

Here, the respective membrane electrode assemblies 1 are formed by laminating the electrolytic membrane 2, the catalytic layers 3, and the gas diffusion layers 4 in this order. Specifically, when being viewed on the fuel-electrode side, each of the membrane electrode assemblies 1 is formed by laminating the electrolytic membrane 2, a catalytic layer 3*f* for fuel and a gas diffusion layer 4*f* for fuel in this order in the thickness direction. When being viewed on the oxidizing-agent-electrode side, each of the membrane electrode assemblies 1 is formed by laminating the electrolytic membrane 2, a catalytic layer 3*o* for oxidizing agent and a gas diffusion layer 4*o* for oxidizing agent in this order in the opposite direction.

Before the freeze step, a retention step is executed, retention step in which water is retained actively in the catalytic layer 3 of the membrane electrode assemblies 1 that constitute the stack. In this case, a humidified hydrogen gas (e.g., relative humidity: 100% RH) is supplied to the flow passage 6*f* for fuel in the separators 5, and humidified air (e.g., relative humidity: 100% RH) is supplied to the flow passage 6*o* for oxidizing agent in the separators 5. In this way, an electric-power generating operation is executed for a predetermined time (e.g., 30 minutes). Although an electric current density is set to 0.2-1.0 amperes/cm$^2$, especially, at 0.5 amperes/cm$^2$, it is not limited to these at all.

At the catalytic layer 3 for oxidizing agent in the membrane electrode assemblies 1, water is generated by means of electric-power generation reaction. Therefore, the moisture content in the catalytic layers 3*o* is enhanced by means of the electric-power generating operation. Hence, the volumetric expandability by means of the freeze of the catalytic layers 3*o* heightens. The moisture content in the catalytic layers 3*f* becomes higher because water in the catalytic layers 3*o* transmits through the electrolytic membranes 2 to arrive at the catalytic layers 3*f* for fuel. Hence, the volumetric expandability by means of the freeze of the catalytic layers 3*o* heightens. Here, in order to make water present down inside the catalytic layers 3*o* and catalytic layers 3*f*, it is more preferable to operate a fuel cell to generate electric power and then make water, which is generated by the electric-power generating operation, present inside the membrane electrode assemblies 1, rather than to immerse the membrane electrode assemblies 1 into water.

After the aforementioned electric-power generating operation is completed, the freeze step is executed. At the freeze step, the entire stack 200 is left at such a low temperature as 20° C. below zero for a predetermined time (90 minutes, for instance). Thereafter, the defreeze step is executed. At the defreeze step, the stack 200 is returned back to room temperature and is then left thereat for a predetermined time (10-90 minutes, for instance). The aforementioned freeze step and defreeze step make the disassembly cycle. Such a disassembly cycle is executed twice furthermore. Specifically, the disassembly cycle is repeated three times (i.e., a plurality of times) in total. Finally, the stack 200 is returned back to room temperature, and then the stack 200 is disintegrated by removing the separators 5 and membrane electrode assemblies 1. By means of thus repeating the freeze step and defreeze step, the structural destruction of the catalytic layer 3 progresses at the membrane electrode assemblies 1 that are incorporated into the stack 200. Therefore, the coming-off property between the gas diffusion layer 4 and the electrolytic membrane 2 improves.

Example No. 9

Explanations will be made additionally on an example according to a case where a membrane electrode assembly 1, to which the freeze step and defreeze step are to be executed, is formed. However, the formation is not limited to this example. Upon making the catalytic layer 3f for fuel, a carbonaceous catalyst with platinum-ruthenium loaded ("TEC62E58" produced by TANAKA KIKINZOKU KOGYO) is used first of all, carbonaceous catalyst in which platinum-ruthenium is loaded in an amount of 57% by mass on electrically-conductive carbon black ("KETJENBLACK EC") that serves as a support for loading catalyst thereon. A mixture is formed by compounding the following: 5 g of this carbonaceous catalyst with platinum-ruthenium loaded; 18 g of pure water; 54 g of an alcohol dispersion liquid of macro-molecular electrolytic polymer ("Aciplex SS-1100" produced by ASAHI KASEI); and 6 g of isopropyl alcohol. Dispersing the resulting mixture is carried out so that secondary particle diameters of the carbonaceous catalyst with platinum-ruthenium loaded become 0.5 μm-1.0 μm, thereby making a catalytic paste for fuel. This catalytic paste is molded as a uniform thin-film shape onto a PTFE sheet ("AFLEX" produced by ASAHI GLASS) using an applicator, and is dried at 80° C. The resulting molded product is cut out to an electrode size, thereby making the catalytic layer 3f for fuel.

Moreover, upon making the catalytic layer 3o for oxidizing agent, a carbonaceous catalyst with platinum loaded ("TEC10E60TPM" produced by TANAKA KIKINZOKU KOGYO) is used, carbonaceous catalyst in which platinum is loaded in an amount of 57% by mass on electrically-conductive carbon black ("KETJENBLACK EC") that serves as a catalytic support. A mixture is formed by compounding the following: 5 g of this carbonaceous catalyst with platinum loaded; 18 g of pure water; 54 g of an alcohol dispersion liquid of macromolecular electrolytic polymer ("Aciplex SS-1100" produced by ASAHI KASEI); and 6 g of isopropyl alcohol. And, dispersing the resulting mixture is carried out so that secondary particle diameters of the carbonaceous catalyst with platinum loaded become 0.5 μm-1.0 μm, thereby making a catalytic paste for oxidizing agent. This catalytic paste is molded as a uniform thin-film shape onto a PTFE sheet ("AFLEX" produced by ASAHI GLASS) using an applicator, and is dried at 80° C. The resulting molded product is cut out to an electrode size, thereby making the catalytic layer 3o for oxidizing agent.

A gas diffusion substrate ("CARBON PAPER" produced by TORAY Co., Ltd.), which has been subjected to a water-repellent treatment, is cut out to an electrode size, thereby making the gas diffusion layer 4f for fuel and gas diffusion layer 4o for oxidizing agent in a quantity of one sheet for each of them. Then, under the following conditions: 150-° C. temperature; 10-MPa (or 100-kgf/cm$^2$) facing pressure; and 1-minute retention time, the catalytic layer 3f for fuel and catalytic layer 3o for oxidizing agent, catalytic layer 3f and catalytic layer 3o which are formed on the aforementioned PTFE sheet, are hot pressed (or joined thermally) so that they are ordered as follows: the catalytic layer 3f for fuel/the electrolytic membrane 2/the catalytic layer 3o for oxidizing agent. The used polymer electrolytic membrane 2 exhibiting proton conductivity is "GORE-SELECT30" that is produced by JAPAN GORE-TEX.

FIG. 1 illustrates the membrane electrode assembly 1 that is directed to the present example. The membrane electrode assembly 1 is formed by laminating the constituent elements in the thickness direction so that they are ordered in the following manner: the gas diffusion layer 4f for fuel; the catalytic layer 3f for fuel; the polymer electrolytic membrane 2; the catalytic layer 3o for oxidizing agent; and the gas diffusion layer 4o for oxidizing agent, as shown in FIG. 1. In accordance with the present example, the catalytic layer 3f for fuel has a catalyst (e.g., platinum-ruthenium), and additionally the catalytic layer 3o for oxidizing agent has another catalyst (e.g., platinum). A platinum loading amount is set to about 0.1-0.3 mg/cm$^2$ in the catalytic layer 3f for fuel, and is set to about 0.5-0.8 mg/cm$^2$ in the catalytic layer 3o for oxidizing agent. And, the separators 5 are assembled with both opposite sides of the membrane electrode assemblies 1, respectively, as shown in FIG. 3, thereby constituting a stack 200. When disassembling this stack 200, the aforementioned freeze step and defreeze step are executed with respect to the stack 200 or the membrane electrode assemblies 1. The aforementioned manufacturing conditions are not limited to above, but are set up suitably depending on needs.

Example No. 10

Figure 4:
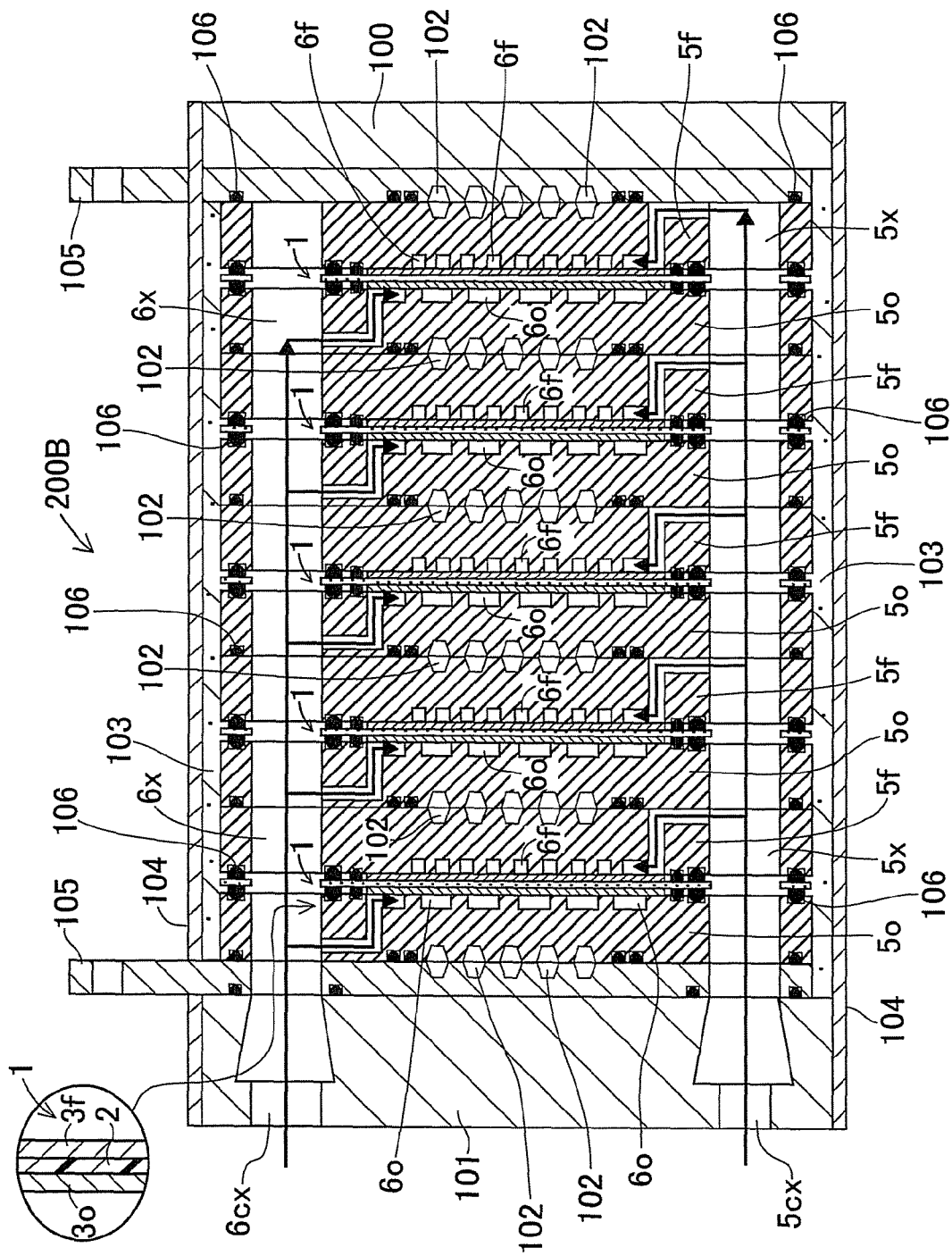
FIG. 4 is a cross-sectional diagram for schematically illustrating an example of a stack.

FIG. 4 illustrates an example of stack. The present example has the same constructions as those of Example No. 1 fundamentally, and operates and then effects advantages in the same manner. As illustrated in FIG. 4, a fuel-cell stack 200B is constituted by means of not only assembling a plurality of membrane electrode assemblies 1 but also assembling a plurality of separators 5f for fuel and a plurality of separators 5o for oxidizing-agent gas. The fuel-cell stack 200B is provided with fuel flow passages 5x that distribute a fuel gas to flow passages 6f for fuel in the respective separators 5f for fuel, and oxidizing-agent-gas flow passages 6x that distribute air to flow passages 6o in the respective separators 5o. A catalyst (e.g., platinum-ruthenium, or platinum) exists in the catalytic layers 3f for fuel. Another catalyst (e.g., platinum) exists in the catalytic layers 3o for oxidizing agent.

And, at a catalyst loading step, not only a hydrogen gas is supplied to the flow passages 6f for fuel in the separators 5f for fuel, but also air is supplied to the flow passages 6o in the separators 5o for oxidizing-agent gas. The hydrogen gas reaches the catalytic layers 3f for fuel via the flow passages 6f in the separators 5f for fuel, and via the gas diffusion layers 4f for fuel. The hydrogen gas, which has reached the catalytic layers 3f for fuel, is decomposed to protons (H$^+$) and electrons (e$^-$) by means of the oxidation reaction by way of the catalyst (e.g., platinum-ruthenium, or platinum) at the catalytic layers 3f for fuel. The electrons (e$^-$) migrate to the oxidizing-agent electrodes by way of electrically-conducting paths, then the reduction reaction is carried out at the catalytic layers 3o for oxidizing agent, and thereby water is generated. Note that, in FIG. 4, "100" designates an end plate; "101" designates a manifold; "102" designates coolant-water passages for flowing coolant water in order to cool the fuel-cell stack 200; "103" designates heat-insulating materials; "104" designates tension plates; "105" designates end terminals; and "106" designates sealing members between the separators 5o and 5f. The manifold 101 is provided with an inlet port 5cx for letting a gaseous fuel into a fuel passage 5x, and an inlet port 6cx for letting an oxidizing-agent gas (e.g., air in general) flow into an oxidizing-agent passage 6x.

In accordance with the present example, a hydrogen gas is supplied to the flow passages 6f for fuel in the separators 5f, and air serving as an oxidizing-agent fluid (e.g., relative humidity: 100% RH) is supplied to the flow passages 6o for oxidizing agent in the separators 5o, thereby executing an electric-power generating operation for a predetermined time (e.g., 30 minutes). An electric current density is set to 0.3-0.7 amperes/cm$^2$. At the catalytic layers 3o for oxidizing agent in the membrane electrode assemblies 1, water is generated by means of the electric-power generation reaction. Therefore, the moisture content in the catalytic layers 3o is enhanced by means of the electric-power generating operation, and accordingly the freezability of the catalytic layers 3o heightens. Since water in the catalytic layers 3o transmits through the electrolytic membranes 2 to arrive at the catalytic layers 3*f* for fuel, the moisture content in the catalytic layers 3*f* becomes higher. Here, in order to make water present down inside the catalytic layers and catalytic layers 3*f*, it is more preferable to make water, which is generated by the electric-power generating operation, present than to immerse the membrane electrode assemblies 1 into water.

After the electric-power generating operation is completed, the freeze step is executed. At the freeze step, the stack 200B, from which wiring is removed, is left at such a low temperature as 20° C. below zero for a predetermined time (e.g., 90 minutes). Thereafter, the defreeze step is executed. At the defreeze step, the stack 200B is returned back to room temperature and is then left thereat for a predetermined time (e.g., 10-60 minutes). The aforementioned freeze step and defreeze step make the disassembly cycle. Such a disassembly cycle is executed twice furthermore.

Specifically, the disassembly cycle is repeated three times (i.e., a plurality of times) in total. Finally, the stack 200B is returned back to room temperature, and then the stack 200B is disintegrated by removing the separators 5*o*, 5*f* and membrane electrode assemblies 1. By means of thus repeating the freeze step and defreeze step, the structural destruction of the catalytic layers 3*o*, 3*f* progresses at the membrane electrode assemblies 1 that are incorporated into the stack 200B. Therefore, the coming-off property between the gas diffusion layer 4 and the electrolytic membrane 2 improves. Note that it is preferable not to freeze water that is included in the electrolytic membrane 2; alternatively it is preferable to make a freezing proportion of water that is included in the electrolytic membrane 2 less than a freezing proportion of water in the catalytic layer 3 (or the catalytic layers 3*o* and catalytic layers 3*f*).

OTHERS

Although the retention step of impregnating the catalytic layer 3 of the membrane electrode assemblies 1 that constitute the stack is impregnated with water serving as the claimed liquid before the freeze step, the retention step can be executed, if needed. Depending on circumstances, it is also allowable to do away with the retention step. In the aforementioned respective examples, it is preferable not to freeze water that is included in the electrolytic membrane 2; alternatively it is preferable to make a freezing proportion of water that is included in the electrolytic membrane 2 less than a freezing proportion of water in the catalytic layer 3 (or the catalytic layer 3*o* and catalytic layer 3*f*). However, it is even allowable to enhance the freezing proportion of water that is included in the electrolytic membrane 2, if needed.

The present invention is not limited to the examples that are mentioned above and are illustrated in the drawings, but are executable while making modifications appropriately within ranges that do not depart from the sprit or scope of the present invention. The specific structures and functions, with which one of the examples is provided, are applicable to the other one of the examples as well. Therefore, it is possible to combine a plurality of the examples partially, or it is also possible to replace the characteristic elements of one of the examples with the characteristic elements of the other one of the examples.

INDUSTRIAL APPLICABILITY

The present invention can avail itself of disassembling fuel cells for stationary, for vehicle, for electric equipment and for electronic equipment, and disassembling membrane electrode assemblies therefor, for instance.

The invention claimed is:

1. A disassembly method for a membrane electrode assembly for fuel cell, the disassembly method for disassembling a membrane electrode assembly for a fuel cell in which a catalytic layer comprising a catalyst and an electrolytic membrane are laminated, the disassembly method comprising:
   an expansion step of volumetrically expanding a volumetrically-expandable material in such a manner that said catalytic layer includes said volumetrically-expandable material; and
   an expansion cancelation step of canceling or reducing volumetric expansion of said volumetrically-expandable material that has undergone volumetric expansion in said catalytic layer.

2. The disassembly method for a membrane electrode assembly for a fuel cell according to claim 1, wherein:
   said volumetrically-expandable material is a liquid;
   said expansion step is a freeze step of freezing said liquid, which is included in said catalytic layer; and
   said expansion cancelation step is a defreeze step of progressively defreezing said liquid that has been frozen in said catalytic layer.

3. The disassembly method for membrane electrode assembly for a fuel cell according to claim 2, wherein said freeze step keeps a proportion of frozen liquid in said electrolytic membrane lower than a proportion of frozen liquid in said catalytic layer, while said freeze step freezes said liquid that is included in said catalytic layer.

4. The disassembly method for a membrane electrode assembly for a fuel cell according to claim 1 further comprising executing a retention step of retaining said volumetrically-expandable material in said catalytic layer of said membrane electrode assembly by impregnating the catalytic layer with the volumetrically-expandable material before said expansion step.

5. The disassembly method for a membrane electrode assembly for a fuel cell according to claim 4, wherein said retention step is executed by means of generating electricity at said membrane electrode assembly by supplying a fuel fluid and an oxidizing-agent fluid to said membrane electrode assembly.

6. The disassembly method for a membrane electrode assembly for a fuel cell according to claim 1, wherein said membrane electrode assembly has a structure in which said electrolytic membrane, said catalytic layer and a reaction-fluid diffusion layer are laminated in that order.

7. The disassembly method for a membrane electrode assembly for a fuel cell according to claim 6 further comprising executing a separation step of separating said reaction-fluid diffusion layer and said electrolytic membrane from each other after said expansion cancelation step.

8. The disassembly method for a membrane electrode assembly for a fuel cell according to claim 1 further comprising executing a recovery step of recovering said catalyst, which is included in said catalytic layer, after said expansion cancelation step.

9. The disassembly method for a membrane electrode assembly for a fuel cell according to claim 1 further comprising reutilizing said electrolytic membrane after said expansion cancelation step.

10. The disassembly method for a membrane electrode assembly for a fuel cell according to claim 1, wherein:
   said volumetrically-expandable material is water; and a moisture content in said electrolytic membrane of said membrane electrode assembly lowers as temperature lowers.

11. A disassembly method for a fuel cell, the disassembly method for disassembling a fuel cell that is equipped with: a membrane electrode assembly for a fuel cell in which an electrolytic membrane, a catalytic layer comprising a catalyst, and a reaction-fluid diffusion layer are laminated in that order; and a separator being laminated on said membrane electrode assembly in a thickness direction thereof, the disassembly method comprising:

an expansion step of volumetrically expanding a volumetrically-expandable material in such a manner that said catalytic layer includes said volumetrically-expandable material; and an expansion cancelation step of canceling or reducing volumetric expansion of said volumetrically-expandable material that has undergone volumetric expansion in said catalytic layer.

12. The disassembly method for a fuel cell according to claim 11, wherein:

said volumetrically-expandable material is a liquid which is capable of expanding volumetrically by means of freezing;

said expansion step is a freeze step of freezing said liquid, which is included in said catalytic layer; and said expansion cancelation step is a defreeze step of progressively defreezing said liquid that has been frozen in said catalytic layer.

* * * * *